United States Patent
Ledjeff et al.

[11] Patent Number: 5,861,221
[45] Date of Patent: Jan. 19, 1999

[54] BATTERY SHAPED AS A MEMBRANE STRIP CONTAINING SEVERAL CELLS

[75] Inventors: Konstantin Ledjeff, Bad Krozingen; Roland Nolte, Denzlingen, both of Germany

[73] Assignee: Fraunhofer Gesellschaft Zur Forderung der Angewandten Forschung E.V., Munich, Germany

[21] Appl. No.: 586,812

[22] PCT Filed: Jul. 27, 1994

[86] PCT No.: PCT/DE94/00888

§ 371 Date: Mar. 22, 1996

§ 102(e) Date: Mar. 22, 1996

[87] PCT Pub. No.: WO95/04382

PCT Pub. Date: Feb. 9, 1995

[30] Foreign Application Priority Data

Jul. 28, 1993 [DE] Germany .......................... 43 25 353.9
Sep. 3, 1993 [DE] Germany .......................... 43 29 819.2

[51] Int. Cl.$^6$ ............................. H01M 8/10; H01M 8/24
[52] U.S. Cl. ............................. 429/32; 429/33; 429/158; 429/162
[58] Field of Search ................................. 429/27, 30, 32, 429/33, 41, 42, 46, 158, 162

[56] References Cited

U.S. PATENT DOCUMENTS

| Re. 24,865 | 9/1960 | Juda et al. . |
| 2,636,851 | 4/1953 | Juda et al. . |
| 2,636,852 | 4/1953 | Juda et al. . |
| 3,554,809 | 1/1971 | Craft . |
| 4,287,272 | 9/1981 | Machi et al. . |
| 4,648,955 | 3/1987 | Maget . |
| 5,035,965 | 7/1991 | Sangyoji et al. . |
| 5,190,834 | 3/1993 | Kendall . |
| 5,217,828 | 6/1993 | Sangyoji et al. . |
| 5,242,764 | 9/1993 | Dhar .......................................... 429/30 |
| 5,336,570 | 8/1994 | Dodge, Jr. . |
| 5,607,785 | 3/1997 | Tozawa et al. ............................ 429/33 |

FOREIGN PATENT DOCUMENTS

| 198483 | 10/1986 | European Pat. Off. . |
| 0482783 | 4/1992 | European Pat. Off. . |
| 482783 | 4/1992 | European Pat. Off. . |
| 1452564 | 9/1966 | France . |
| 1814702 | 7/1969 | Germany . |
| 3139400 | 4/1983 | Germany . |
| 58-053162 | 3/1983 | Japan . |
| 02100268 | 4/1990 | Japan . |
| 50413221 | 2/1993 | Japan . |
| 9405051 | 3/1994 | WIPO . |

OTHER PUBLICATIONS

"Handbook of Batteries and Fuel Cells," David Linden (ed.), McGraw–Hill Book Company, 1984. (Month N/A).

Appleby et al., Energy (Oxford), 11, p. 137 (1986). (Month N/A).

Patent Abstracts of Japan, vol. 14, No. 308 (E–0947, published Jul. 3, 1990.

Patent Abstracts of Japan, vol. 007, No. 140 (E–182), Jun. 18, 1983.

Patent Abstracts of Japan, vol. 017, No. 334 (E–1387), Jun. 24, 1993.

An International Search Report, dated Nov. 14, 1994 and Annex.

Patent Abstracts of Japan of JP 2–100268, E–947, Jul. 3, 1990, vol. 14, No. 308.

Patent Abstracts of Japan of JP 61–171 067, E–465, Dec. 18, 1986, vol. 10, No. 379.

Patent Abstracts of Japan of JP 57–69 674, E–123, Aug. 6, 1982, vol. 6, No. 147.

*Primary Examiner*—Stephen Kalafut
*Attorney, Agent, or Firm*—Greenblum & Bernstein, P.L.C.

[57] ABSTRACT

An electrochemical cell has at least one membrane strip that forms a central area and at least two, maximum 10,000 flat individual cells. The individual cells consist each of an electrode layer applied on both sides of a membrane made of a polymer solid electrolyte and of a corresponding number of flat electronically conductive areas. The individual cells are connected in series and the central area is provided with an appropriate periphery in the cell.

19 Claims, 6 Drawing Sheets

BATTERY SHAPED AS A MEMBRANE STRIP CONTAINING SEVERAL CELLS

CROSS REFERENCE TO RELATED APPLICATIONS

The present invention claims the priority under 35 U.S.C. § 119 of German Patent Applications Nos. P43 25 353.9 filed on Jul. 28, 1993 and P43 29 819.2 filed on Sep. 3, 1993.

The invention relates to the structure of an electrochemical cell with a core region comprising a plurality of individual cells, which are designed in the form of a strip membrane.

Discussion of Background Information

Electrochemical cells, e.g. with polymeric solid electrolytes, consist basically of two electrodes, at which the electrochemical reactions occur, and with an interposed electrolyte, which fulfils the purpose of ion transportation between the electrodes, and which consists of an ion conductive polymer.

If, at both electrodes, electrochemical reactions occur freely (oxidation at the anode, reduction at the cathode), the electrochemical cell provides a voltage. One individual cell provides only a relatively small voltage in the region from a few milivolts up to a few volts. For many practical applications, such for example as the use of battery fuel cells in the field of traction, however, considerably higher voltages are required.

Until the present, therefore, a plurality of such cells was built up separately, located one behind the other and incorporated in series, so that the voltages of the individual cells are added to one another. This type of series incorporation does in fact enable larger voltages to be produced, but involves considerable disadvantages. Technically and constructively, such series incorporation is extremely complex. For example, for a hydrogen/oxygen fuel cell stack there is generally required for each individual cell a bipolar plate, a hydrogen gas distributor ring, an ion exchange membrane coated with catalyst, an oxygen gas distributor ring, seal rings in order to seal these components, and current distributor structures. This comes in all to 10 components per individual cell. If for example a stack output of 70 volts is to be produced, with an individual cell voltage of 0.7 volts, 100 individual cells are required, i.e. 1000 components must be combined, with the necessity to fix 400 seal rings.

A further disadvantage arises from series incorporation in that, when a single cell in the fuel cell stack fails, the entire stack breaks down. A redundant method of construction for the above example, i.e. incorporation in parallel of a plurality of 70 volt stacks, would however drive the construction costs to levels which can no longer be justified.

SUMMARY OF THE INVENTION

Proceeding from this, therefore, the object of the present invention is to propose an electrochemical cell which, compared to prior art, has a simpler and more cost-effective construction, and permits a reliable method of operation.

Firstly the invention proposes that the core region of an electrochemical cell should be formed by so-called strip membranes. By the term 'core region of the electrochemical cell' is meant the unit at which the electrochemical reactions take place. According to the invention, the core region comprises at least one sheet-like strip membrane which has at least 2 and a maximum of 10,000 individual cells incorporated in series.

Incorporation of the individual cells may be effected either by electronically conductive regions or by a step-like configuration of the individual cells.

The preferred embodiment proposes that incorporation be undertaken via sheet-like electronically conductive regions.

The strip membrane itself in this case consists of regions located in sheet form next to one another, which have different conductivities.

A region is formed by the individual cell itself. In order to ensure ion conductivity, the individual cell is made of an ion conductive material. For this purpose polymeric solid electrolytes in the form of membranes are used. As either cations or anions must be transported, the membrane must be permeable either to cations or anions. Ion conductivity in an aqueous environment for cation conductive polymers is generally provided when carbonic acid groups and/or sulphonic acid groups and/or phosponic acid groups, solidly anchored in the polymer, i.e. generally anchored by chemical bonding, are present. For ion conductive polymers, ion conductivity exists when the polymer includes amino groups, quaternary ammonium groups or pyridinium groups. The capacity for ion conductivity is produced in the possibilities described above, in that ions solidly anchored in the membrane exist, or are generated by swelling in water.

Examples of cation conductive polymers of this type are sulphonated polysulphones, polyethersulphones or also polyetherketones. Polymers can have ion conductivity even in a nonaqueous environment. For this purpose the polymers must contain groups which can release inorganic salts. This capacity is possessed for example by polymers such as poly (ethylenoxide) which, because of the presence of solvating ethylenoxide units, can release inorganic salts, such for example as lithium perchlorate, and accordingly have conductivity for lithium ions.

In this case the thickness of the membrane can lie in the range between 0.5 um and 1 mm, preferably in the region from 10 um to 200 $\mu$m. The surfaces of the membrane for the individual cell depend on the required performance of the stack. The surfaces may lie within a range of 1 $mm^2$ to 1,000,000$^2$, preferably in the region between 100 and 10,000 $mm^2$.

In order to permit them to function as an individual cell, the membranes described above are coated on both sides with electrode material. As the electrochemical conversions of the cell take place at the electrodes, the electrodes may either themselves consist of a material which is electrochemically converted, or of a material which catalyses the electrochemical conversion. The material must be electronically conductive and in particular consist of metals, metal oxides, mixed oxides, alloys, carbon, electronically conductive polymers or mixtures thereof.

The materials may contain additives which serve to adjust hydrophily and hydrophobic properties. Thus for example the electrode layers may be provided with water-repelling properties. Furthermore, additives are possible which permit the adjustment of a certain porosity. This is of particular importance when gaseous materials are catalytically converted at the electrodes, a three-phase contact being necessary between gas, catalyst and ion-conductive region. Again, so-called binders may be added, which facilitate stable and functional bonding of the electrodes to the ion-conductive region.

This individual cell constructed in this manner is now incorporated electrically in series with the aid of sheet-like electronically conductive regions with other individual cells.

The electron-conductive regions have the purpose of producing electronic conductivity respectively between one electrode surface of one individual cell and the electrode surface of the next individual cell located on the other side of the membrane.

For the electronically conductive regions, materials are used which, instead of the ion conductivity of the individual cell, now have electron conductivity. The function of the strip membrane is in this case independent of specific polymeric materials for the electron-conductive regions, as long as the capacity of the regions for electron conductivity exists. Electron conductivity in polymeric materials can be achieved by using polymers which are enabled by their molecular structure to achieve electron conductivity, such as for example is the case with polyacetylene or polythiophenes.

Electron conductivity may also be generated if a certain proportion of conductive substances is mixed with a non-conductive polymer. The conductive substances in particular involve conductive carbon black, graphite, carbon fibres, particles or fibres of polymers which are themselves conductive, metal particles, flakes or fibres or metallised carrier materials.

The polymers may contain additives in order to alter the swelling behaviour in water. This is particularly important when the membrane is used in an aqueous environment. In this case ionically conductive regions of the membrane, provided with charged groups, swell, this being noticeable through an alteration in the geometrical dimensions. Other regions, which are not provided with charged chemical groups, on the other hand scarcely swell at all, so that mechanical tensions arise at the border surfaces of both layers. In order to avoid this, there may be mixed with the regions not provided with charged groups an additive, which adapts the swelling behaviour of both.

An essential factor in the invention is that the individual cells described above are incorporated in series via the electronically conductive regions. For this purpose either the lower electrode surface of a membrane of an individual cell is connected via the electronically conductive regions with the following individual cell, and in fact here with the upper electrode surface. Conversely, it is naturally just as possible to connect the upper electrode surface of a first individual cell via the electronically conductive region with the lower electrode surface of the next individual cell.

With such a structure, the electrode-coated, ionically conductive regions, (corresponding to an individual cell) border directly on the electronically conductive regions. In order to avoid short-circuiting at the border of the coated upper and lower side of the ionically conductive region by the electronically conductive regions, which involves failure of the individual cell, the electrode coatings may not be applied as far as the edge of the ionically conductive material. In each case, only the upper or the lower electrode coating of an individual cell may be electrically conductively connected with the adjacent electrically conductive region. This is achieved by coating, on one side of the ion-conductive region, the region between the electrode coating and electronically conductive region, with electronically conductive structures, so that an electrical circuit incorporation as defined above of the individual membrane regions becomes possible. The material used for this purpose consists either of the materials described under materials for the electronically conductive regions, or of those described under materials for electrode coating of the membrane.

In this way, an in-series incorporation of the individual single cells is achieved via the electronically conductive regions. In this case the dimensions of the electronically conductive region correspond in thickness and width approximately to those of the individual cell, so that in all a sheet-like strip membrane results, which consists of periodically repeated regions, i.e. on the one hand of the individual cell, and on the other hand of the electronically conductive regions.

According to a preferred embodiment, it is now proposed that insulating regions are disposed between individual cells and the electronically conductive regions. In this case the dimensions (thickness, width) correspond approximately to those of the individual cell or of the conductive region.

These regions serve for electrical insulation between the regions with differing conductivities. They therefore consist of polymeric material which is both ionically and electronically non-conductive. The function of the strip membrane is independent of specific polymeric materials for the non-conductive regions, as long as the materials are neither ionconductive nor electron-conductive. Therefore polymeric materials are used which are categorised neither under "materials for the ion-conductive regions of the membrane units" nor under "materials for the electronically conductive regions".

When the membrane is constructed with insulating regions, contrary to the structure without insulating regions, the electrode coatings can have the same surface area as the ion-conductive membranes.

In order to provide in-series incorporation in this development of the invention, it must be ensured that there is a reliable connection via the electronically conductive regions with the lower or upper electrode surface of the individual cells. This is made possible in that the strip membrane is coated in specific areas, i.e. on the upper or lower membrane surface of the insulating area, with electronically conductive structures, so that a defined electrical incorporation of the individual membranes is possible, in such a way that one electrode surface of one individual cell is respectively connected with the electrode surface of the next individual cell, disposed on the other side of the membrane. The material used for this purpose consists either of the materials used for the electronically conductive regions, or of the materials described under materials for electrode coating of the membrane.

A strip membrane which, according to the preferred embodiment, possesses additional insulation areas, is accordingly constructed of periodically-repeated areas of the individual cell, the insulation region and the electronically conductive region. The strip membrane preferably consists of 2 to 10,000 individual cells.

In an embodiment according to the present invention, the in-series incorporation is achieved by a step-shaped configuration, in such a way that one electrode surface of one individual cell at the same time fulfils the purpose of the electronically conductive region. In this case a separate electronically conductive region is omitted, as are the insulating regions. In order in this case to ensure in-series incorporation of two individual cells, the cells overlap in such a way that the lateral area of one electrode surface of the first individual cell is directly conductively connected with the lateral area of the electrode surface on the other membrane side of the next individual cell. In this case there results a strip membrane in which the separate individual cells are aligned in a step configuration overlapping one another. The structure of the individual cell corresponds to the type above described.

It is further proposed according to the invention that the electrochemical cell has a strip membrane as described above as a core region.

According to a preferred embodiment, it is proposed to construct the core region now in a different way.

According to a first variant it is now possible to use a strip membrane as described above. This strip membrane may for example include 2 to 10,000 individual cells, incorporated one after the other, in the way described above. This "one-dimensional strip membrane" can still have on all 4 sides lateral strips of electronically non-conductive material.

In a variant, a plurality (up to 50) of one-dimensional strip membranes may be disposed next to one another, these one-dimensional strip membranes disposed next to one another being incorporated in series. There then result so-called "two-dimensional strip membranes". The individual one-dimensional strip membranes disposed next to one another may be connected together by separating regions of electronically nonconductive material. In a second embodiment, 2 or more (up to 50) one-dimensional strip membranes are disposed next to one another, these one-dimensional strip membranes disposed next to one another being incorporated in parallel. There then result so-called "two-dimensional strip membranes". The individual one-dimensional membranes disposed next to one another may be connected together by separating areas of electronically non-conductive material. Thus different volt ages and redundancies can be generated.

According to the invention either one one-dimensional strip membrane or two two-dimensional strip membranes with a corresponding periphery form the core region of the electrochemical cell.

Basically, the strip membrane according to the invention may be used in all electrochemical cells. An overview of this may be obtained from the "Handbook of Batteries and Fuel Cells, David Linden (Editor in Chief), McGraw-Hill Book Company, 1984". In the following (Table) some preferred electrochemical cells, characterised by their selection of electrodes, are listed. Particularly suitable is the strip membrane according to the invention for fuel cells.

The preferred cell types are listed in the following in the form of a Table:

The group identified with electrode material 1 describes the material with which the ion-conductive regions of the strip membrane are coated on one side. If the electrode material does not itself represent the electrochemically active component, the latter is given additionally in brackets [ ].

The group identified with electrode material 2 describes the material with which the ion-conductive regions of the strip membrane are coated on the other side. If the electrode material does not itself represent the electrochemically active component, the latter is additionally given in brackets [ ].

The electrolyte describes the material of which the ion-conductive region of the strip membrane consists.

TABLE

| Electrode material 1 | Electrode material 2 | Electrolyte |
| --- | --- | --- |
| Poly-acetylene (PA) Li | Polythiophene (PTh) Polyaniline (PAn) Polypyrrol (PPy) Polythiophene (PTh) Polyaniline (PAn) Polypyrrol (PPy) Polyacetylene (PA) | $Li^+$ conductive polymer and conductive salt (e.g. $LiClO_4$) $Li^+$ conductive polymer and conductive salt (e.g. $LiClO_4$) |

TABLE-continued

| Electrode material 1 | Electrode material 2 | Electrolyte |
| --- | --- | --- |
|  | $Bi_2O_3$, $Bi_2Pb_2O_5$ $(CF)_n$ (intercalary compound between carbon and fluorine $CuCl_2$, $CuF_2$, CuO, CuS, FeS, $FeS_2$, $MnO_2$, MoO3 $Ni_3S_2$, Agcl, $AG_2CrO_4$, $V_2O_5$ | $Li^+$ conductive polymer and conductive salt |
|  | Metal, carbon, graphite- $[O_2,]$ conductive structure (e.g. metal or carbon) -$[SO_2, SOCl_2, SO_2Cl_2]$ | $Li^+$ conductive polymer and conductive salt |
| Zn | Graphite, carbon, metals- $[O_2]$, metal, graphite, carbon- $[Cl_2, Br_2]$ | ion-conductive polymer |
| Zn | AgO, $MnO_2$, HgO, NiOOH | ion-conductive polymer |
| Mg | $MnO_2$ | ion-conductive polymer |
| Al | $MnO_2$ graphite, carbon, metals- $[O_2]$ | ion-conductive polymer |
| Cd | HgO AgO NiOOH | ion-conductive polymer |
| Fe | NiOOH graphite, carbon, metals - $(O_2)$ Ago | ion-conductive polymer |
| Pb | $PbO_2$ | ion-conductive polymer |
| Noble metal, graphite, carbon $[H_2]$ | NIOOH AgO metal, graphite, carbon- $[Cl_2, Br_2]$ | ion-conductive polymer |

According to the invention, the core region must be located respectively with a suitable periphery, in the cells described above.

In the case of a fuel cell stack, the core region must be disposed in a casing, in such a way that two chambers result in the casing, which are closed off in a gas-tight manner from one another. The casing must then have corresponding supply means for a first gas, e.g. hydrogen on one side into the first chamber of the casing, and supply means for a second gas, e.g. oxygen, into the second chamber on the other side of the core region.

By means of this principle of arrangement it is now possible to integrate the expensive three-dimensional structure of previous series circuits into a, so to speak, two-dimensional membrane (strip membrane), for which only one periphery is now necessary. If thus, as in the initial example, a 70 volt stack is required, for this purpose 100 individual cells are integrated into a membrane, so that now only two end plates, two gas distributor rings and 4 seals are necessary in order to provide a functional fuel cell stack. Contrary to this, in the fuel cell stacks of prior art 100 bipolar plates, 200 gas distributor rings and 400 seals were necessary. Thus the invention enables a decisively more cost-effective and simpler structure of a fuel cell stack.

If now for example hydrogen is offered on one membrane side and oxygen on the other, and if the electrodes for example consist of a porous platinum layer, then each strip membrane operates as a hydrogen/oxygen fuel cell. Due to the series incorporation of the individual cells, the individual voltages of each strip membrane are added together, so that a fuel cell with a high output voltage may be produced with a single membrane surface. If for example the strip membranes as described above are incorporated electrically in parallel, and if the membrane operates in the hydrogen/oxygen fuel cell mode, failure of one strip membrane has almost no effect on the overall voltage, as only that strip membrane in which the defective membrane unit is located no longer provides voltage. Due to the parallel incorporation of the groups, the overall voltage may now be generated by the other groups. Contrary to this, in the case of a simple series incorporation of electrochemical cells, upon one individual cell becoming defective, the overall voltage collapses, as the circuit is broken.

BRIEF DESCRIPTION OF THE DRAWINGS FIGURES

Further details, features and advantages of the present invention will become apparent from the following description of the manufacturing process for the strip membrane, and with reference to FIGS. 1 to 6, which will explain the invention in more detail with reference to the example "fuel cell stack".

FIG. 2b shows the cross-section of a membrane unit according to FIG. 2a;

FIG. 2c schematically shows the regions 1 to 4 depicted in FIG. 2a;

DETAILED DESCRIPTION OF THE PREFERRED EMBODIMENTS

Figure 1:
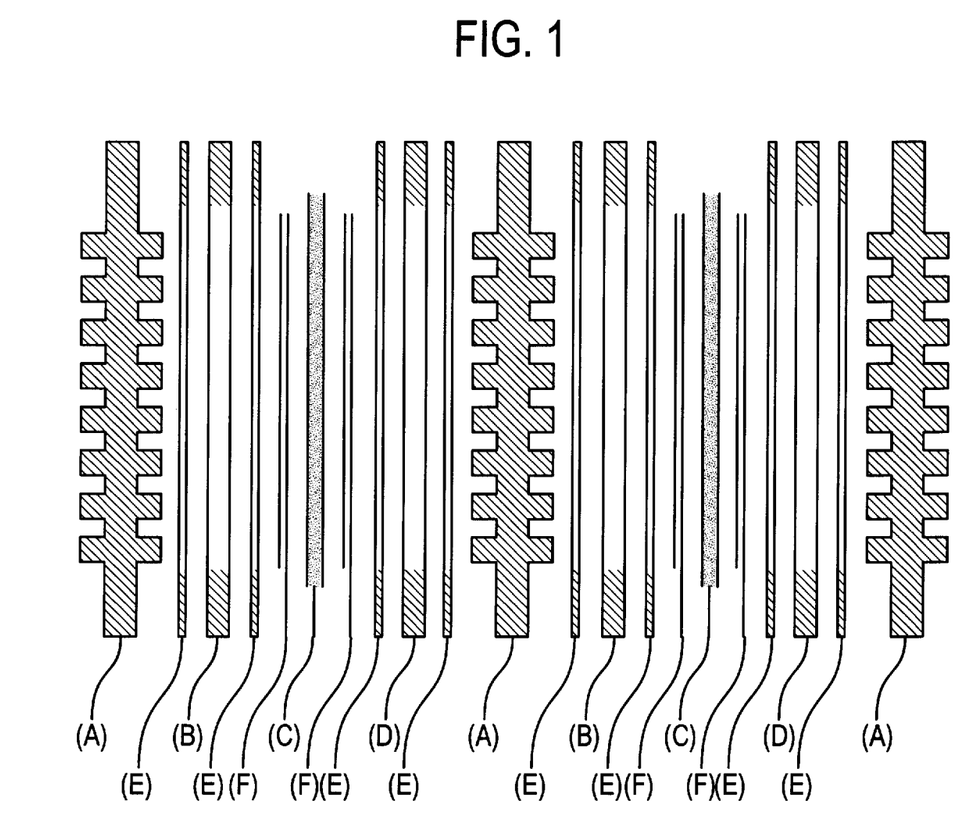
FIG. 1 shows the structure of a previously-known fuel cell stack.

FIG. 1 illustrates the extreme constructive complexity of a fuel cell stack according to prior art. As FIG. 1 shows, each individual cell of a hydrogen/oxygen fuel cell stack generally requires a bipolar plate A, a hydrogen gas distributor ring B, an ion exchange membrane C, coated with catalyst, an oxygen gas distributor ring D, seal rings E for sealing these components, and the current distributor structures F.

These are in all 10 components per individual cell. If for example a stack output voltage of 70 volts is to be produced, in the case of an individual cell voltage of 0.7 volts, 100 individual cells are required, i.e. 1,000 components must be combined, and 400 seal rings fixed.

Figure 2A:
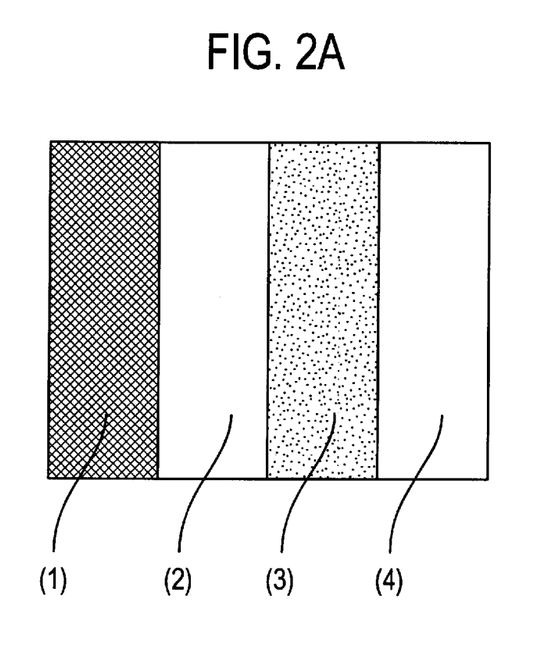
FIG. 2a shows in plan view the periodically repeating regions of a strip membrane in the preferred embodiment, with an insulating region.
Figure 5:
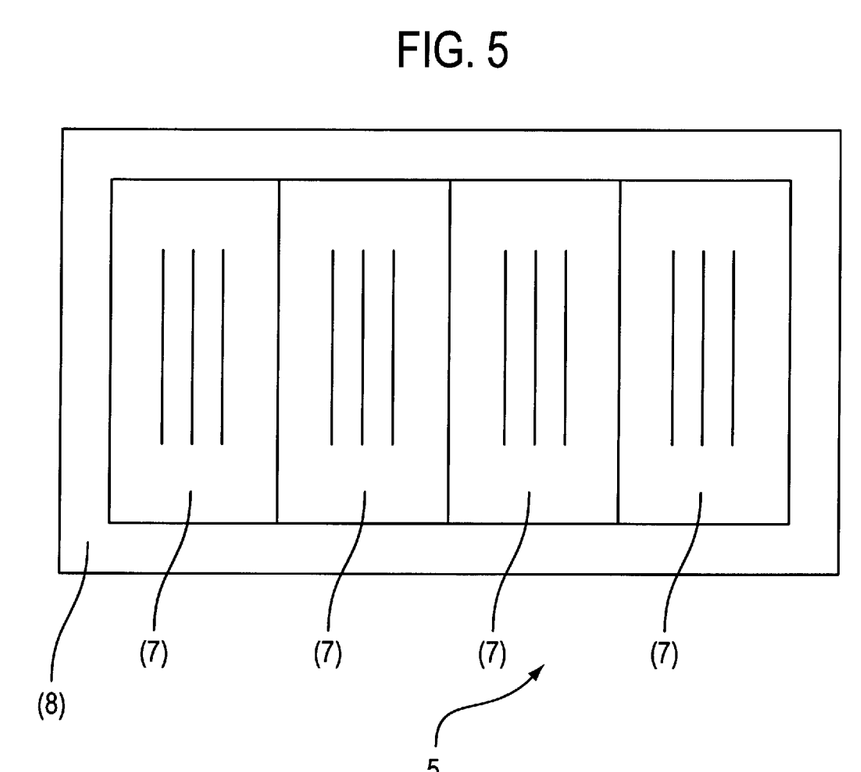
FIG. 5 shows a one-dimensional strip membrane schematically.

FIG. 2a shows the regions, disposed one behind the other, of a strip membrane, with insulating regions 2, 4. The first region 1 in this case is purely ionically conductive, and shows the membrane surface of the individual cell. The second region 2 is both ionically and electronically nonconductive and represents the insulating region. The third region 3 is purely electronically conductive, and the fourth region in turn is both ionically and electronically nonconductive and in turn represents an insulating region. These units are now periodically repeated in a strip membrane. The sequence of regions 1 to 4 shown in FIG. 2a is symbolised in illustrations 2c and 5 by the rectangle 7. The units 1 to 4 form a membrane unit and represent the basic unit of the finished strip membrane (shown without series incorporation for reasons of improved clarity).

Figure 2B:
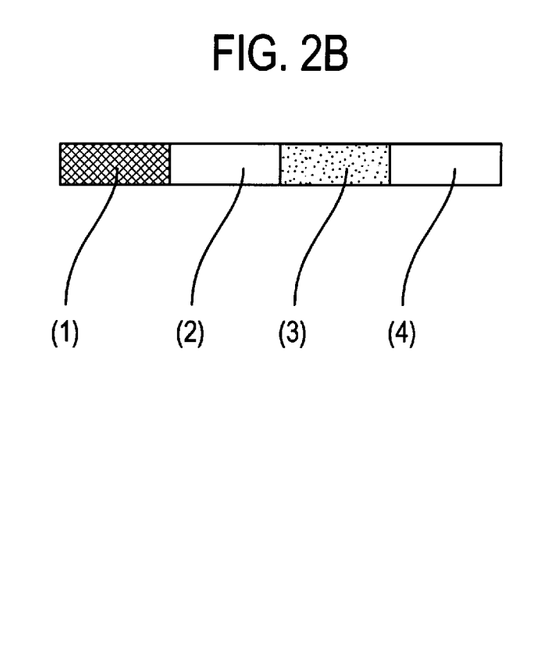
Figure 2C:
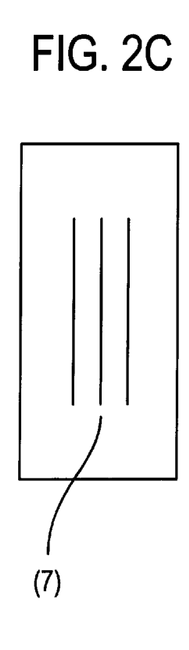

FIG. 2b shows a cross-section through such a membrane. In this case the strip membrane is of a thickness varying in a region between 0.5 $\mu$m and 1 $\mu$m, preferably in a region between 10 $\mu$m to 200 $\mu$m. All surfaces from which the strip membrane is built up accordingly likewise have thicknesses in this order of magnitude. The surfaces of the respective regions depend on requirements, i.e. on the power which is to be produced by the strip membrane. The surface areas of each individual region in this case can come to 1 mm$^2$ to 1,000,000 mm$^2$.

Figure 3:
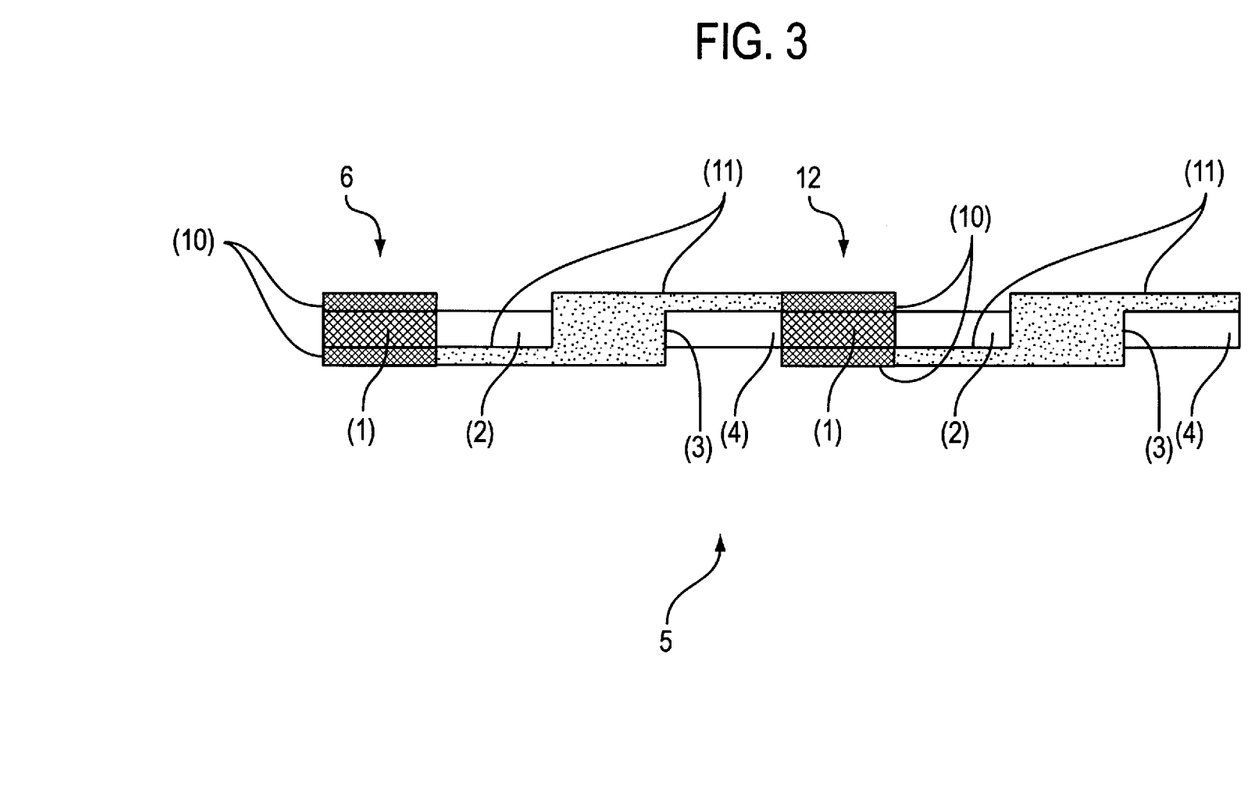
FIG. 3 shows the electrical circuit incorporation of the strip membrane.

FIG. 3 now shows the in-series incorporation of a strip membrane as described in FIG. 2. An essential feature of the invention here is that the lower electrode surface 10 of a first individual 6 is connected in series via the electronically conductive region 3 with the upper electrode surface (10) of a second individual cell 12. As, in the embodiment according to FIG. 3, insulating regions 2, 4 are provided, the in-series incorporation must be effected by an additional coating 11. The periodic repetition of such units shown in cross-section in FIG. 3, then forms a strip membrane.

Thus the strip membrane 5 may be produced from separate, finished individual surfaces. In this case all the individual surfaces required to build up the strip membrane (i.e. the individual regions of the respectively used type of membrane, and if necessary separating regions and lateral strips) are separately produced before manufacture of the actual membrane in the required size, and subsequently connected to provide the overall strip membrane 5. Films of the corresponding materials are used (polymeric films, films of modified polymers, etc.) from which pieces of the required shape are cut. The ionically conductive regions 1 of the membrane may be already coated with electrode material 10, or coating with electrode material 10 may be effected after combination of the individual pieces. The pieces are disposed in the geometrical configuration of the strip membrane type to be manufactured, and are connected together in a permanent and gas-tight manner. The pieces are connected by previously known adhesive methods such for example as adhesion by solvents, dispersions, melting agents, contact or reaction adhesives, or by thermal methods such for example as welding, so that a surface results consisting of one piece, which permits no direct gas contact between the upper and lower sides of the membrane. In reinforcement of this, the individual surfaces may be connected by additional compression.

Another possible way of manufacturing membranes consists in using polymeric materials which may be changed into the free-flowing condition, i.e. which are for example meltable or soluble in specific solvents. All the regions of the membrane are produced in that the free-flowing materials are applied by suitable metering and distributing devices to a substrate (such for example as a glass plate), and films of this material are produced by cooling of the melt or evaporation of the solvent.

This application of the various regions may be done in succession, i.e. the first material is applied in a free-flowing form to the substrate and cooled (melt) or dried (solution), so that a film results on the substrate. Then the next material of the adjacent region is applied in a free-flowing form and the film is produced. In the selection of suitable materials which are compatible with one another, it is possible that, by means of the respective application of the free-flowing material, the lateral regions of the adjacent region already produced, will be dissolved as well in the case of dissolved materials and, in the case of molten materials, may be transferred into the plastic state (polymers), so that a bond with the adjacent region results simultaneously with the application of the respective free-flowing material. Subsequent adhesion/welding of the regions, even under pressure, is possible.

In another possible method, the various regions may be applied simultaneously. For this purpose the materials brought into the free-flowing condition are applied via suitable metering and distributor arrangements simultaneously and next to one another to the substrate in such a way that the various materials, still in a free-flowing state, mix in the lateral regions on the substrate. Subsequent drying (in the case of dissolved materials) or subsequent cooling (in the case of melts) fixes the materials which are already connected together. Finally, the membrane is released from the substrate. Additional subsequent adhesion/welding of the regions is possible. The simultaneous application of the various materials is particularly suitable for continuous manufacturing processes for strip membranes.

The electrode coating 10 is applied to the ionically conductive regions 1 of the membrane units. The principle of function of the strip membrane 5 is independent of the type of electrode application; the technique of application must however ensure the following:

the electrode must be applied to the membrane in such a way that an exchange of materials of the ions to be transported is possible between the ionically conductive membrane regions and the electrodes.

the electrode material must have an electronic shunt conductive capacity, in order to enable current take-off.

For example, the application of the electrode material 10, with or without additives, is possible by pressure methods. In this case the electrode material is the initial material, which may be present for example in the form of powder, and is pressed together with the membrane. A possible type of such a method is contained in Appleby, Yeager, Energy (Oxford), 11 (1986), 137. If thermal plastic polymers are used for the ionically conductive regions 1 of the membrane, the electrode material 10 may be particularly well combined by pressure at high temperatures with the regions, as these latter may be transferred into the plastic condition by the heating. If soluble polymers are used for the ionically conductive regions 1, an intensive electrode bond is achieved by superficial dissolution of the regions with suitable solvents before application of pressure. In this method, the electrode material 10 may be present for example as a powder, or in the form of a film (e.g. be applied on to a carrier or polymer-bonded) or as a solid block of material.

Another possibility is to apply the electrode material 10 as a suspension, with or without additives, in the free-flowing condition, to the membrane, and to produce the electrode coating by drying. In this case, when soluble materials are used for the ionic regions of the membrane units, the membrane surface may be dissolved by the suspension, so that after drying the desired internal bond between ionically conductive material and electrode results. It is likewise possible to precipitate the electrodes by thin-layer methods, (such for example as sputtering or plasma processes), if necessary with suitable masks, to the membrane; subsequent treatment of the layers may follow in order to achieve a porous structure.

In order to improve the shunt conductive capacity of the electrode layer it is possible to apply to the catalysts layers integrated in the membrane electrically conductive structures for current collection (e.g. metallic nets), these being glued, pressed or welded to the membrane. For the preferred embodiment with the insulating regions 2, 4, electronically conductive compounds 11 must be applied.

These must enable the electrical connection of electronically conductive surfaces, the electronically conductive surfaces involving the electronically conductive electrode layers 10 and the electronically conductive regions 3 of the membrane units. In this case the electrically conductive material 11 used is applied to the membrane between the regions to be connected. The most various methods are possible for applying the electrically conductive material 11 to the membrane. The functional principle of the strip membrane is independent of the type of application; the technique of application need only ensure the electrical connection of the desired regions.

Thus for example it is possible to glue films of electrically conductive material 11 with electronically conductive adhesive to the membrane. Likewise, the use of thermoplastic polymers may render possible welding of the films to the membrane. Adhesion is rendered possible by the use of soluble polymers by means of dissolution procedures of the membrane surface or of the conductive films. Furthermore, polymer solutions may be used which contain electrically conductive particles, the suspension being applied to the membrane and, after evaporation of the solvent, the conductive structure results.

Thermoplastic polymers modified in order to achieve electrical conductivity may also be applied in the molten state to the membrane and be connected therewith. It is likewise possible to precipitate the electrically conductive layers 11 by means of thin-layer methods (such for example as sputtering or plasma processes), if necessary with suitable masks, to the membrane.

The electronically conductive connections 11 may consist of the same material as the electrodes, and may be applied in the same working step with them to the membrane, e.g. by means of the pressing method described in the application of the electrode material.

Figure 4:
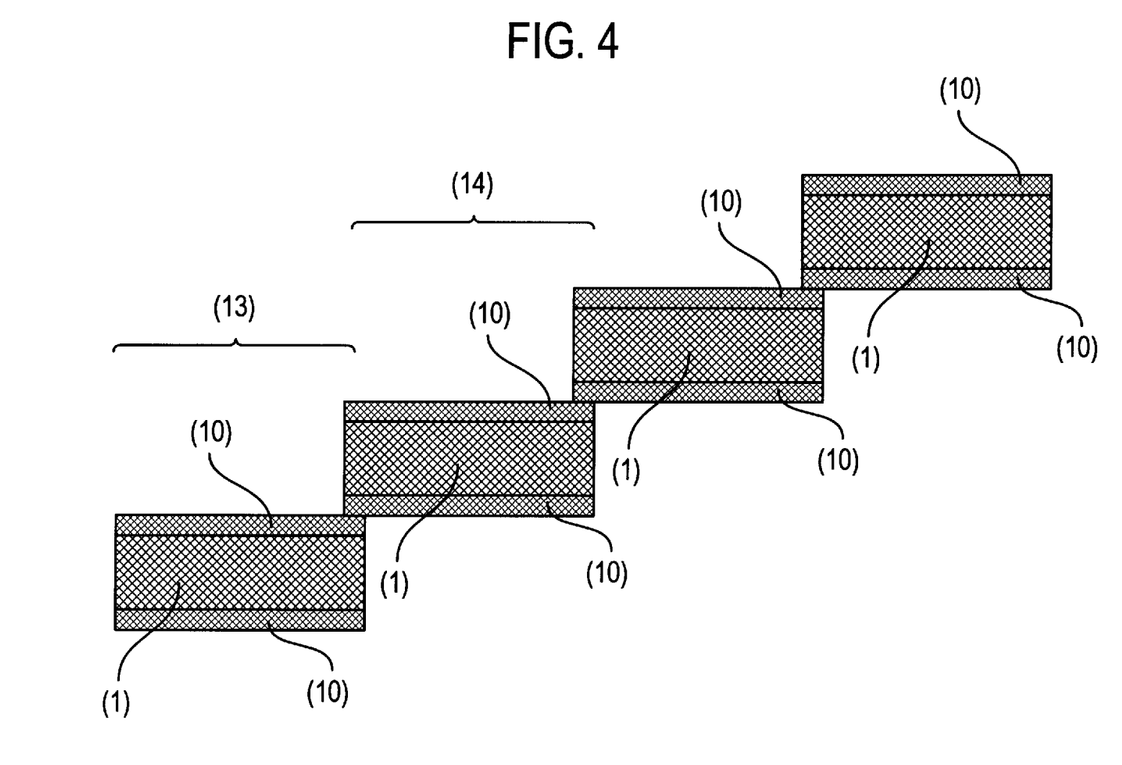
FIG. 4 shows the structure and the electrical circuit incorporation of a strip membrane in the embodiment in which the electrode surface simultaneously undertakes the purpose of the electronically conductive regions.

FIG. 4 now shows the structure and circuit incorporation of a strip membrane in which the electrode surface 10 simultaneously fulfils the role of the electronically conductive regions. The essential factor here is that the upper electrode surface 10 of a first individual cell 13 is directly connected with the lower electrode surface 10 of a second individual cell 14, and thus undertakes electrical series incorporation of the individual cells. This bond must be electronically conductive and impermeable to gas. In particular, the structure of the strip membrane, in which the electric surface 10 simultaneously fulfils the role of the electronically conductive regions, is built up from separate complete individual cells, the coating of the ionically conductive regions with electrode material being effected before connection of the individual pieces. The adhesion or welding of the individual surfaces must be electronically conductive.

FIG. 5 shows now the diagrammatic structure of a one-dimensional strip membrane 5. The numeral 7 represents the regions 1 to 4 described in FIG. 2a or 2b. These regions 1 to 4, identified by 7-FIG. 2c are now shown as in FIG. 3, incorporated in series and thus forming the one-dimensional strip membrane 5. This arrangement is termed a one-dimensional strip membrane and may possess on all four sides lateral strips 8 of electronically non-conductive material. FIG. 5 shows the structure with reference to the example of a one-dimensional strip membrane which consists of four basic units.

Figure 6:
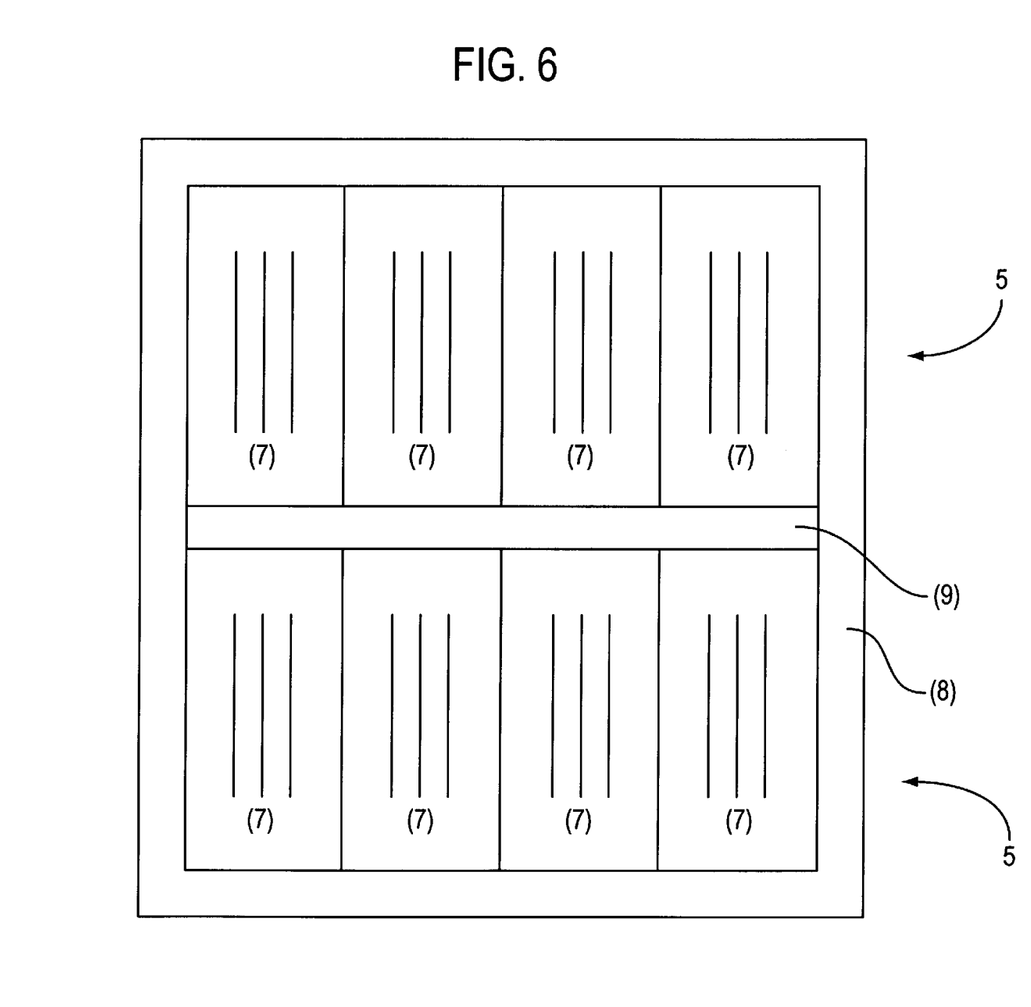
FIG. 6 shows a two-dimensional strip membrane.

FIG. 6 shows the arrangement in which two one-dimensional strip membranes 5 are incorporated in parallel. The individual strip membranes in this case are connected together by separating regions 9 of electronically non-conductive material. This arrangement is termed a two-dimensional strip membrane, and may in turn have on all four sides lateral strips 8 of electronically non-conductive material. FIG. 6 shows the structure with reference to the example of a two-dimensional strip membrane consisting of two one-dimensional strip membranes 5 with four respective basic units.

What is claimed is:

1. An electrochemical cell assembly comprising:
    at least one strip membrane assembly having at least two substantially flat individual cells;
    each individual cell including a polymeric solid electrolyte membrane having a first and a second side, and an electrode layer being deposited on the first and second side;
    the polymeric solid electrolyte membranes of the individual cells being physically separated from each other; and
    electronically conductive regions electronically coupling the polymeric solid electrolyte membranes of the individual cells in series, such that the electrode layer on the first side of a first individual cell is electronically coupled to the electrode layer on the second side of an adjacent individual cell.

2. The electrochemical cell according to claim 1, the individual cells are coupled in series through a plurality of electronically conductive regions that correspond in number to the individual cells.

3. The electrochemical cell according to claim 1, the electronically conductive regions electronically coupling the polymeric solid electrolyte membranes of the individual cells in series comprising between two and 50 strip membranes which are insulated from one another and positioned in a parallel arrangement.

4. The electrochemical cell assembly according to claim 3, the electronically conductive regions electronically coupling the polymeric solid electrolyte membranes of the individual cells in series further comprising a two-dimensional strip membrane.

5. The electrochemical cell according to claim 1, further comprising insulating elements located between the individual cells and the electronically conductive regions.

6. The electrochemical cell according to claim 1, the membrane comprising one of a cation-conductive polymer and an anion-conductive polymer.

7. The electrochemical cell according to claim 6, the cation conductive polymer comprises at least one member selected from the group consisting of securely-bound carbonic acid, sulphonic acid, and phosphonic acid groups to achieve cation conductivity in an aqueous solution, and compounds containing chemical groupings which can solvate inorganic salts in a non-aqueous environment.

8. The electrochemical cell according to claim 7, the compounds containing chemical groups which solvate inorganic salts comprise polymers having polyethylenoxide units.

9. The electrochemical cell according to claim 6, the anion-conductive polymer comprises at least one grouping selected from the group consisting of amino groupings, quaternary ammonia groupings, and pyridinium groupings to achieve anion conductivity in an aqueous solution.

10. The electrochemical cell according to claim 1, the electrode coating comprising one of metals, metallic oxides, mixed oxides, alloys, carbon, electronically conductive polymers and mixtures thereof.

11. The electrochemical cell according to claim 1, the electronically conductive regions comprising one of electronically conductive polymers comprising polyacetylene and polymers which, in order to achieve an electrical conductivity, are modified by conductive substances including at least one of conductive carbon black, graphite, carbon fibers, electronically conductive polymer particles of fibers, metallic particles, flakes, and metallic carrier material.

12. The electrochemical cell according to claim 1, the electronically conductive regions electronically coupling the polymeric solid electrolyte membranes of the individual cells in series comprising a maximum of 10,000 individual cells.

13. The electrochemical cell according to claim 1, the plurality of electronically conductive regions corresponding to a number of the sheet-like individual cells.

14. An electrochemical cell assembly comprising:
    at least one strip membrane assembly having at least-two substantially flat individual cells;
    each individual cell including a polymeric solid electrolyte membrane having a first and a second side, and an electrode layer being deposited on the first and second side;
    the polymeric solid electrolyte membranes of the individual cells being physically separated from each other; and
    the individual cells being coupled in series in an overlapping manner, such that the electrode layer on the first side of a first individual cell is electronically coupled to the electrode layer on the second side of an adjacent individual cell.

15. The electrochemical cell according to claim 14, the at least one strip membrane assembly comprising between 2 and 50 strip membranes which are insulated from each other and positioned in a parallel arrangement.

16. The electrochemical cell according to claim 14, the polymeric solid electrolyte membrane comprising one of a cation-conductive polymer and an anion-conductive polymer.

17. The electrochemical cell according to claim 16, the cation-conductive polymer comprises at least one member selected from the group consisting of securely-bound carbonic acid, sulfonic acid, and phosphonic acid groups to achieve cation conductivity in an aqueous solution, and compounds containing chemical groupings which can solvate inorganic salts in a non-aqueous environment.

18. The electrochemical cell according to claim 17, the compounds containing chemical groups which solvate inorganic salts comprise polymers having polyethylenoxide units.

19. The electrochemical cell according to claim 16, the anion-conductive polymer comprises at least one grouping selected from the group consisting of amino groupings, quaternary ammonia groupings, and pyridinium groupings to achieve anion conductivity in an aqueous solution.

* * * * *